(12) United States Patent
Kim et al.

(10) Patent No.: US 8,489,034 B1
(45) Date of Patent: Jul. 16, 2013

(54) ANTENNA SWITCHING WITH A SINGLE RECEIVE CHAIN

(71) Applicant: Apple Inc., Cupertino, CA (US)

(72) Inventors: Yuchul Kim, Santa Clara, CA (US); Kee-Bong Song, Santa Clara, CA (US); Syed Aon Mujtaba, Santa Clara, CA (US)

(*) Notice: Subject to any disclaimer, the term of this patent is extended or adjusted under 35 U.S.C. 154(b) by 0 days.

(21) Appl. No.: 13/711,442

(22) Filed: Dec. 11, 2012

Related U.S. Application Data

(60) Provisional application No. 61/695,940, filed on Aug. 31, 2012.

(51) Int. Cl.
*H04B 1/40* (2006.01)
(52) U.S. Cl.
USPC .............................. 455/75; 370/278; 342/372
(58) Field of Classification Search
USPC .............. 455/418, 78, 75, 129; 370/278, 297; 342/372, 374
See application file for complete search history.

(56) References Cited

U.S. PATENT DOCUMENTS

2006/0292996 A1* 12/2006 Malasani et al. ................. 455/78
2010/0041355 A1* 2/2010 Laroia et al. ................... 455/129

* cited by examiner

*Primary Examiner* — Phuoc Doan
(74) *Attorney, Agent, or Firm* — Park, Vaughan, Fleming & Dowler, LLP; Steven E. Stupp

(57) ABSTRACT

In order to improve the communication performance and communication reliability of an electronic device, a communication quality metric is determined based on information communicated via a wireless network using a single antenna. For example, the communication quality metric may be determined based on acknowledgment (ACK) and negative-acknowledgment (NACK) messages in the communicated information or a number of packets retransmitted and a number of new packets transmitted in the communicated information. Then, one of at least two antennas is selected based on the determined communication quality metric. In this way, the electronic device may effectively use a single receive chain to provide improved communication of the information.

20 Claims, 13 Drawing Sheets

ANTENNA SWITCHING WITH A SINGLE RECEIVE CHAIN

CROSS REFERENCE TO RELATED APPLICATION

This application claims priority under 35 U.S.C. §119(e) to U.S. Provisional Application Ser. No. 61/695,940, entitled "Antenna Switching with a Single Diversity Chain," by Yuchul Kim, Kee-Bong Song, and Syed A. Mujtaba, filed on Aug. 31, 2012, the contents of which is herein incorporated by reference.

BACKGROUND

1. Field

The described embodiments relate to techniques for communicating information between electronic devices.

2. Related Art

Many wireless communication devices, such as cellular telephones, include multiple antennas to provide improved communication performance, which can result in: a higher data rate, a lower transmission delay, and/or a lower transmit power. For example, communication devices that include multi-mode modems can enhance the communication performance in a wireless network by concurrently transmitting or receiving information using the multiple antennas. These communication devices typically use communication protocols that implement third-generation (3G) or newer radio access technology (e.g., a communication protocol compatible with International Mobile Telecommunications-2000 specifications by the International Telecommunication Union of Geneva, Switzerland).

However, many legacy communication devices operate with a single transmit and receive chain. These legacy communication devices typically use communication protocols that implement second-generation (2G) radio access technology, such as the Global System for Mobile Communication (GSM) or General Packet Radio Service (GPRS). Moreover, because these legacy communication devices operate with a single transmit and receive chain, it can be difficult to upgrade these legacy communication devices to obtain improved communication performance. As a consequence, the user experience associated with legacy communication devices could be worse than the devices with multiple receive chains.

SUMMARY

The described embodiments include an electronic device that includes: a first antenna and a second antenna, a switch coupled to the first antenna and the second antenna, an interface circuit coupled to the switch, and control logic coupled to the interface circuit and the switch. The interface circuit communicates information via a cellular-telephone network. Moreover, the control logic determines a communication quality metric based on the communicated information, and provides a signal to the switch selecting one of the first antenna and the second antenna based on the determined communication quality metric. In response to the signal, at a given time during operation of the electronic device, the switch selectively couples the interface circuit to one of the first antenna and the second antenna.

Note that the interface circuit includes a single receive chain. However, the communication technique implemented in the electronic device can be used with an electronic device that includes multiple receive chains, which may be used for concurrent transmission and/or receiving of the information.

In some embodiments, the communication quality metric is based on acknowledgment (ACK) and negative-acknowledgment (NACK) messages in the communicated information. For example, the communication quality metric may be based on a ratio of NACK messages to a size of a time window used to compute the ratio and a difference in packet positions in a sequence of packets. In particular, the communication quality metric may be based on the ratio of NACK messages to the difference of the starting positions of the consecutive ACK/NACK message time windows plus the size of the ACK/NACK message time window. This communication quality metric may be substantially stable as a location of the time window used to compute the ratio is varied in the sequence of packets (for example, changes in the communication quality metric may be smaller than 5-10%). Furthermore, determining the communication quality metric may involve filtering.

Alternatively or additionally, the communication quality metric may be based on a number of packets retransmitted and a number of new packets transmitted in the communicated information. For example, the communication quality metric may be based on a ratio of the number of packets retransmitted to the number of new packets transmitted in the communicated information. Moreover, determining the communication quality metric may involve accumulating incremental communication quality metrics determined in sub-time intervals when the information is communicated.

Another embodiment provides an integrated circuit that includes the control logic.

Another embodiment provides a method that includes at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to improve the communication performance and communication reliability of an electronic device, a communication quality metric is determined based on information communicated via a wireless network. For example, the communication quality metric may be determined based on acknowledgment (ACK) and negative-acknowledgment (NACK) messages in the communicated information or a number of packets retransmitted and a number of new packets transmitted in the communicated information. Then, one of at least two antennas is selected based on the determined communication quality metric. In this way, the electronic device may effectively use a single receive chain to provide improved communication of the information.

Figure 1:
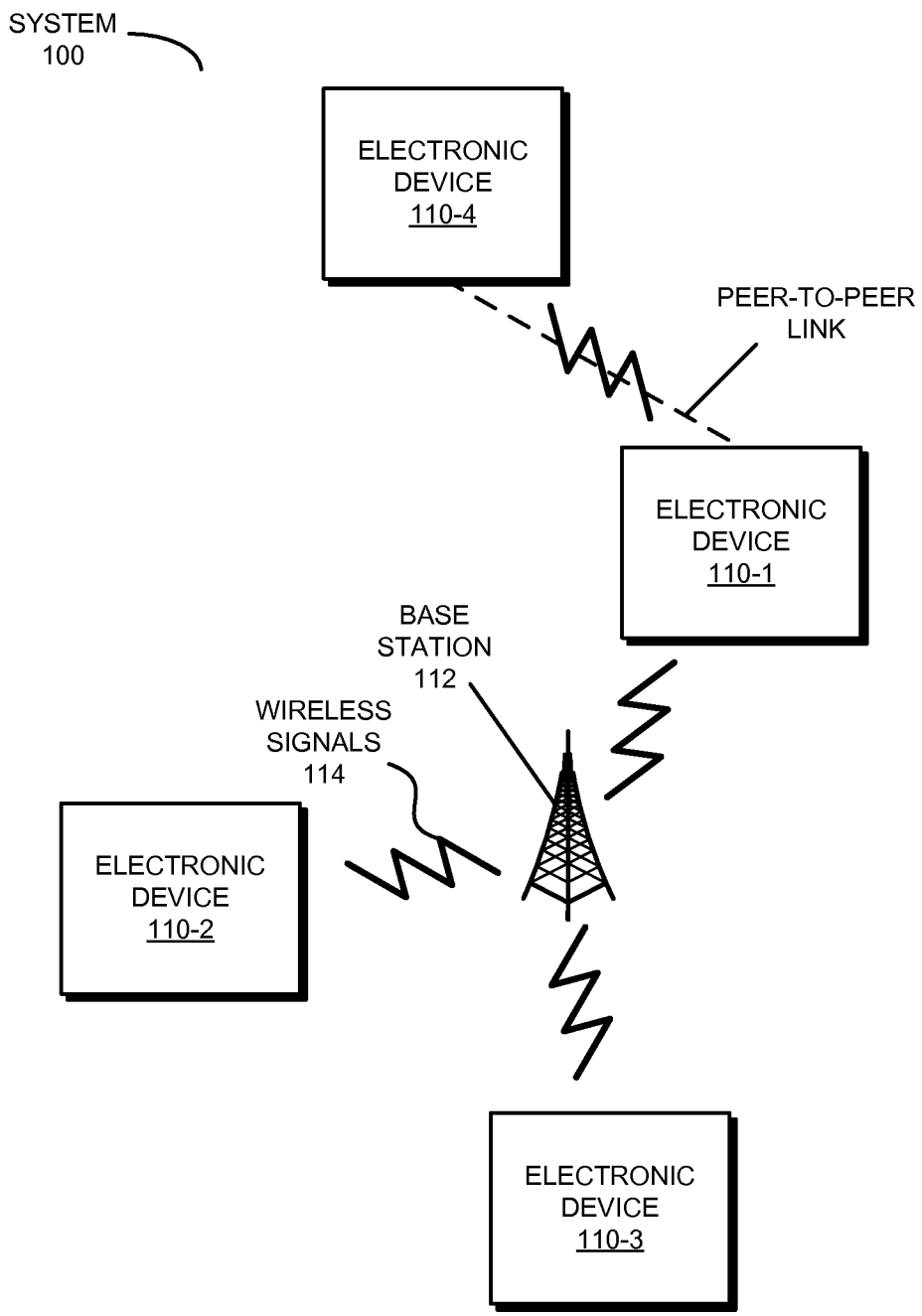
FIG. 1 is a block diagram illustrating electronic devices wirelessly communicating in accordance with an embodiment of the present disclosure.

The communication between the electronic device and other electronic devices is shown in FIG. 1, which presents a block diagram illustrating electronic devices 110 wirelessly communicating. In particular, these electronic devices may wirelessly communicate via a cellular network (using Universal Mobile Telecommunication System or UMTS, Long Term Evolution or LTE, etc.), a wireless local area network or WLAN (e.g., a communication protocol compatible with one or more of the Institute of Electrical and Electronics Engineers standard 802.11), a Bluetooth™ network (from the Bluetooth Special Interests Group of Kirkland, Wash.), and/or another type of wireless network. For example, the wireless communication may involve communicating information via an established wireless network, such as via a base station 112. Alternatively, the wireless communication may involve electronic devices 110: discovering one another by scanning wireless channels; transmitting and receiving advertising frames on wireless channels to enable electronic devices 110 to make initial contact, followed by exchanging subsequent data/management frames (such as connect requests) to establish a connection; configuring security options (e.g., IPSEC); transmitting and receiving packets or frames via the connection, etc.

As described further below with reference to FIG. 13, each of electronic devices 110 may include subsystems, such as a networking subsystem, a memory subsystem and a processor subsystem. In addition, electronic devices 110 may include radios in the networking subsystems. More generally, electronic devices 110 can include (or can be included within) any electronic devices with the networking subsystems that enable electronic devices 110 to wirelessly communicate with another electronic device.

As can be seen in FIG. 1, wireless signals 114 (represented by jagged lines) are transmitted from a radio in electronic device 110-1. These wireless signals 114 are received by radios in one or more of the other electronic devices in FIG. 1, either directly or indirectly (for example, wireless signals 114 may be relayed by base station 112).

In the described embodiments, processing information (such as a packet or frame) in electronic devices 110 includes: receiving wireless signals 114 with the information; decoding/extracting the information from received wireless signals 114 to acquire the information; and processing the information (such as a command or a payload in a frame or a packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving information.

While problems during communication among electronic devices 110 and base station 112 can occur in the uplink (UL) or the downlink (DL), in general the DL is less of a problem because high transmit power is used and, when a communication problem occurs in the DL, the received signal strength can be used as a communication quality metric to guide optimization. In electronic devices that use 3G radio access technology, multiple receive chains in the baseband integrated circuit can be used to receive signals concurrently. This can allow the UL communication performance to be optimized when communication problems occur. However, in legacy electronic devices that use 2G radio access technology (such as General Packet Radio Service or GPRS, or Enhanced GPRS or EGPRS), this capability may not be possible because the baseband integrated circuit may only include a single receive chain. While this challenge can, in part, be addressed by including multiple antennas, it can be difficult to determine which antenna to use when the antennas can only be used one at a time.

Figure 2:
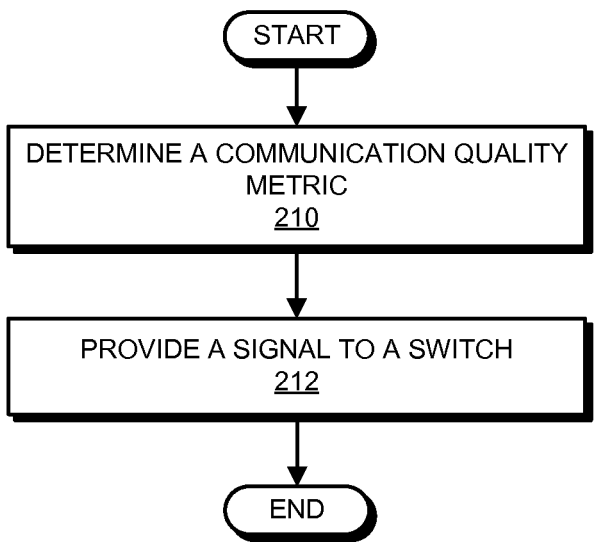
FIG. 2 is a flow diagram illustrating a method for selectively coupling an interface circuit to one of a first antenna and a second antenna in an electronic device in accordance with an embodiment of the present disclosure.

In the discussion that follows, a communication technique that facilitates adaptive switching based on a communication quality metric is described. This communication technique is shown in FIG. 2, which presents a flow diagram illustrating a method 200 for selectively coupling an interface circuit to one of a first antenna and a second antenna in an electronic device, such as electronic device 1300 (FIG. 13). During operation, control logic in the electronic device determines a communication quality metric (operation 210) based on information communicated via the interface circuit and a cellular-telephone network. Then, the control logic provides a signal to a switch (operation 212) in the electronic device specifying the selective coupling of the interface circuit to one of a first antenna and a second antenna in the electronic device based on the determined communication quality metric. Furthermore, at a given time during operation of the electronic device, the switch selectively couples the interface circuit to one of the first antenna and the second antenna.

In some embodiments of method 200, there may be additional or fewer operations. Moreover, the order of the operations may be changed, and/or two or more operations may be combined into a single operation.

In an exemplary embodiment, the electronic device (such as electronic device 1300 in FIG. 13) can transmit or receive using either an RF0 or an RF1 port via a double-pole, double-throw switch. However, because the communication is through one port at a time (as opposed to simultaneous communication), it can be difficult to decide which port to use. In the disclosed communication technique, the switching decision may be based on measurements in the DL and/or the UL. For example, a communication quality metric may be determined based on: the Received Signal Strength Indicator (RSSI) in the DL; ACK/NACK messages or indications in the DL, the UL, or both; and/or the number of newly transmitted and retransmitted packets. Techniques for determining the communication quality metric or link quality detection (LQD) are described below.

Consider a wireless system in which a sender sends data packets to a receiver, and the receiver acknowledges received packets by sending acknowledgment packets in which ACK/NACK indications are encoded in a bitmap. The bitmap may be a sequence of 0s and 1s, where '0' and '1' indicate NACK and ACK, respectively. Moreover, the length of the bitmap may be variable. Furthermore, the bitmap usually includes a starting sequence number (SSN) that specifies the sequence number of the packet corresponding to the first bit in the bitmap (which, depending on the specification, could denote the last sequence number of the packet in the bitmap). For example, the receiver may receive: {SSN=2, Bitmap=1000111}. This may indicate that the $2^{nd}$, $6^{th}$, $7^{th}$, and $8^{th}$ packets were received correctly and the $3^{rd}$, $4^{th}$, and $5^{th}$ packets were not received correctly.

The NACK_ratio, which quantifies the ratio of NACK indications out of the total transmissions, may be a communication quality metric that indicates whether the current link condition is good or bad. For example, if the NACK_ratio significantly exceeds a given threshold, the link condition from the sender to the receiver may be deemed bad. In particular, let nACK and nNACK be the number of 1s and 0s in the $n^{th}$ acknowledgment packet. Then, one way to compute the NACK_ratio (without the SSN) is $$\text{NACK\_ratio} = \frac{nNACK}{nACK + nNACK},$$

where nACK plus nNACK equals the length of the bitmap. However, as described further below, this way of computing the NACK_ratio typically leads to an incorrect estimate of the link quality. By including SSN information, the NACK_ratio computation can be improved to provide a better indication of link quality.

Figure 3:
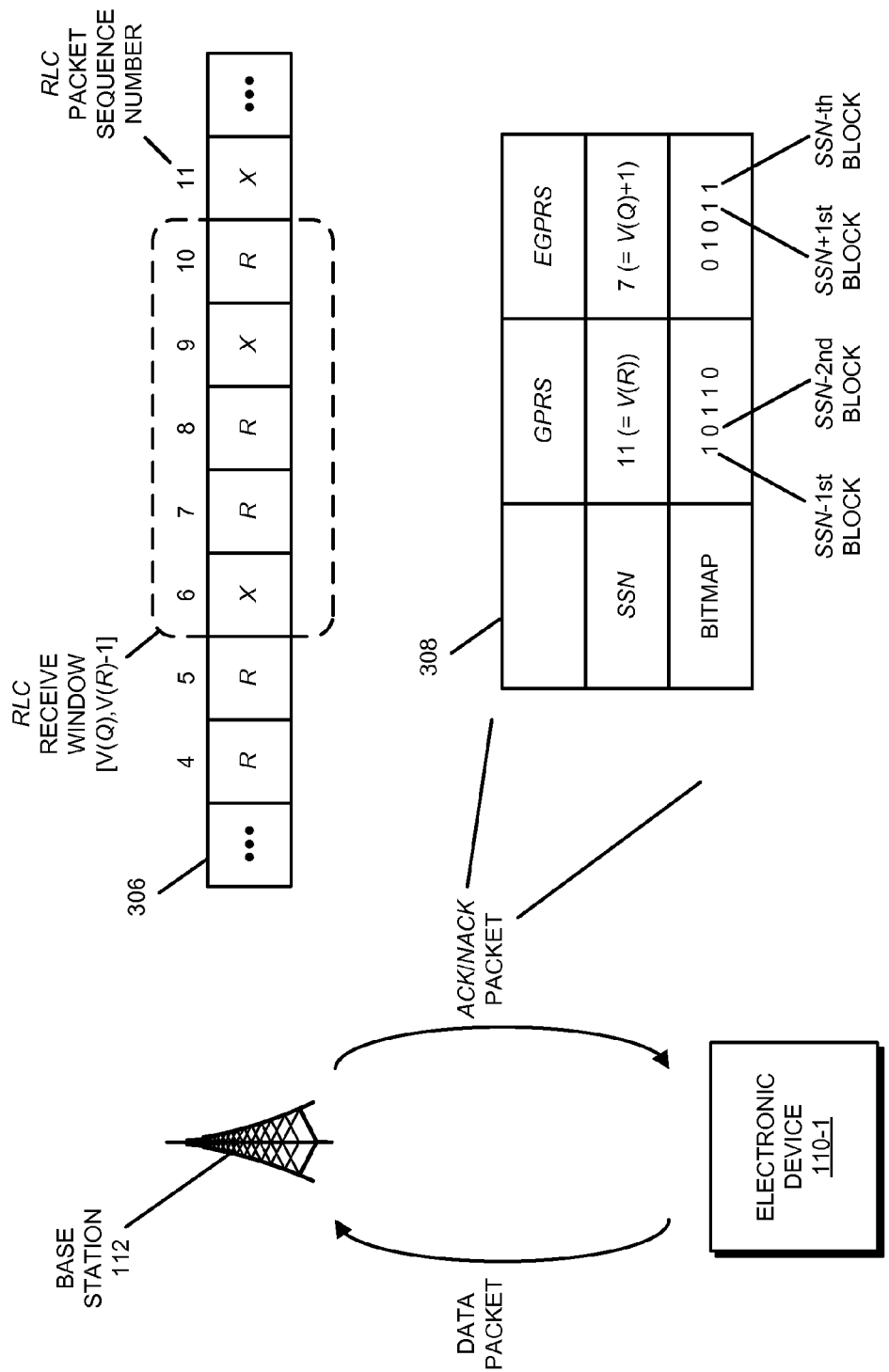
FIG. 3 is a drawing illustrating determination of a communication quality metric in accordance with an embodiment of the present disclosure.

This communication quality metric is illustrated for GPRS or EGPRS in FIG. 3, which presents a drawing illustrating determination of a communication quality metric. In this example, the Radio Link Control (RLC) is an automatic repeat request (ARQ) protocol which provides a low-error data transmission service between the sender (electronic device 110-1) and the receiver (base station 112). In sequence 306 maintained in the receiver (base station 112 in case of UL transmission), 'R' represents packets that were correctly received and 'X' represents packets that were not received. Furthermore, V(R) is the highest correctly received sequence number in the RLC receive window plus 1, and V(Q) is the oldest missing sequence number in the RLC receive window. Suppose the current status of receive window 306 is as shown in FIG. 3, and the receiver sends an ACK/NACK message to the transmitter (electronic device 110-1) containing an ACK/NACK information bitmap reflecting the current receive window. The bitmaps corresponding to the current receive window are summarized in table 308 for GPRS and EGPRS. Note that GPRS and EGPRS have different definition for the starting (SSN) field, so they could have different bit maps for the same receive window. Based on the information in the ACK/NACK message packet from the receiver, the NACK_ratio is computed as 3/5. If the NACK_ratio is greater than a threshold value, the sender may conclude that the link is bad.

Figure 4:
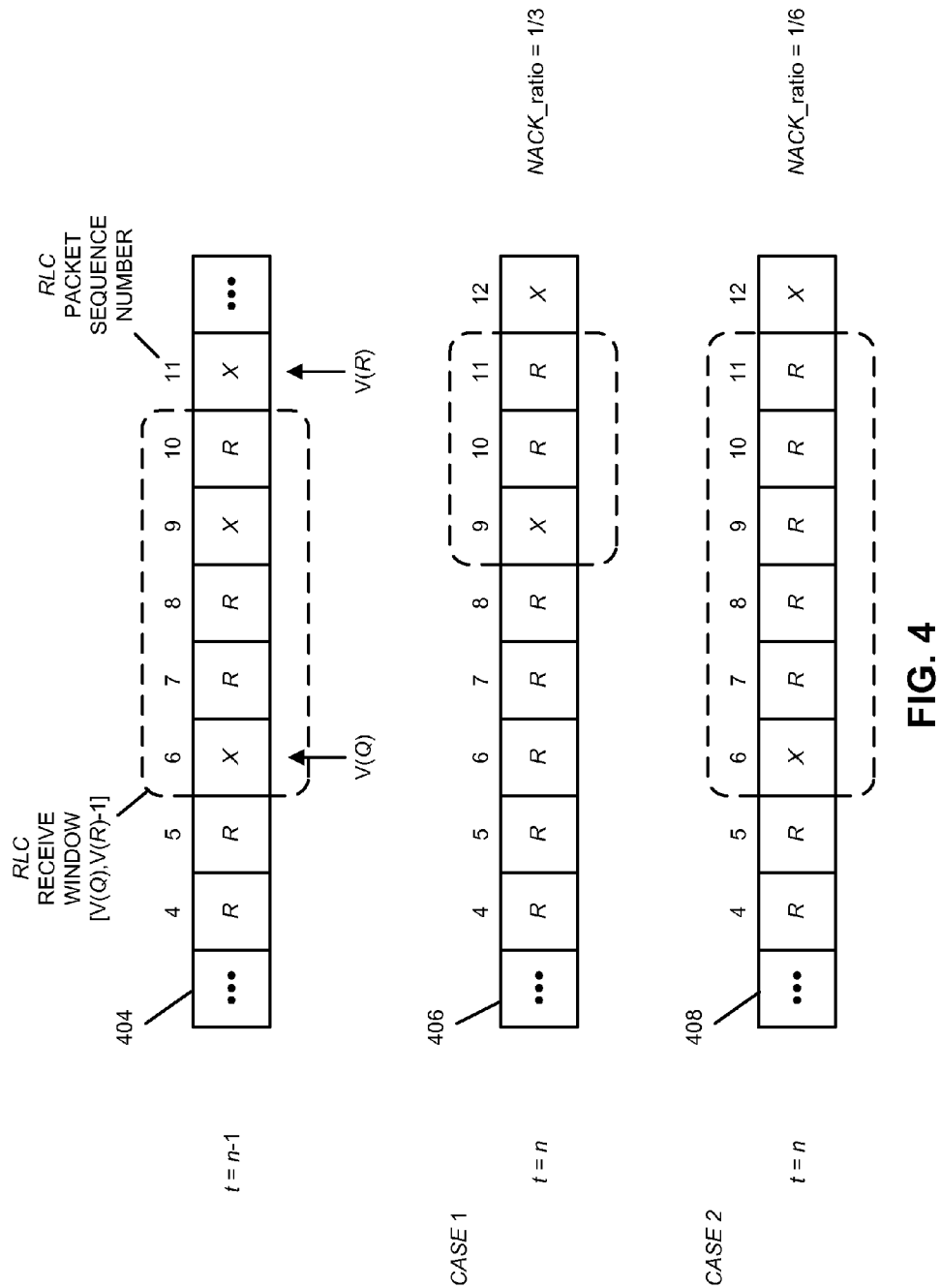
FIG. 4 is a drawing illustrating determination of a communication quality metric in accordance with an embodiment of the present disclosure.

However, this approach for computing the NACK_ratio considers only the number of 1s and 0s in the most recently received bitmap. Therefore, even when the channel or link condition is similar, this approach can produce different values of the NACK_ratio, depending on the location of 0s. This problem is illustrated in FIG. 4, which presents a drawing illustrating determination of a communication quality metric for GPRS. In sequence 404, we have the receive window status at time t=n−1. Packet 6 and 9 are not correctly received. Consider the following two different cases where, in case 1, packets 6 and 11 were received correctly as shown in sequence 406, and in case 2, where packets 9 and 11 were received correctly as shown in sequence 404. In both cases, channel conditions are similar since two packets are received correctly. The only difference is the location of the received packet in receive window. However, the NACK_ratio for the case 1 is 1/3, while it is 1/6 for the case 2.

Figure 5:
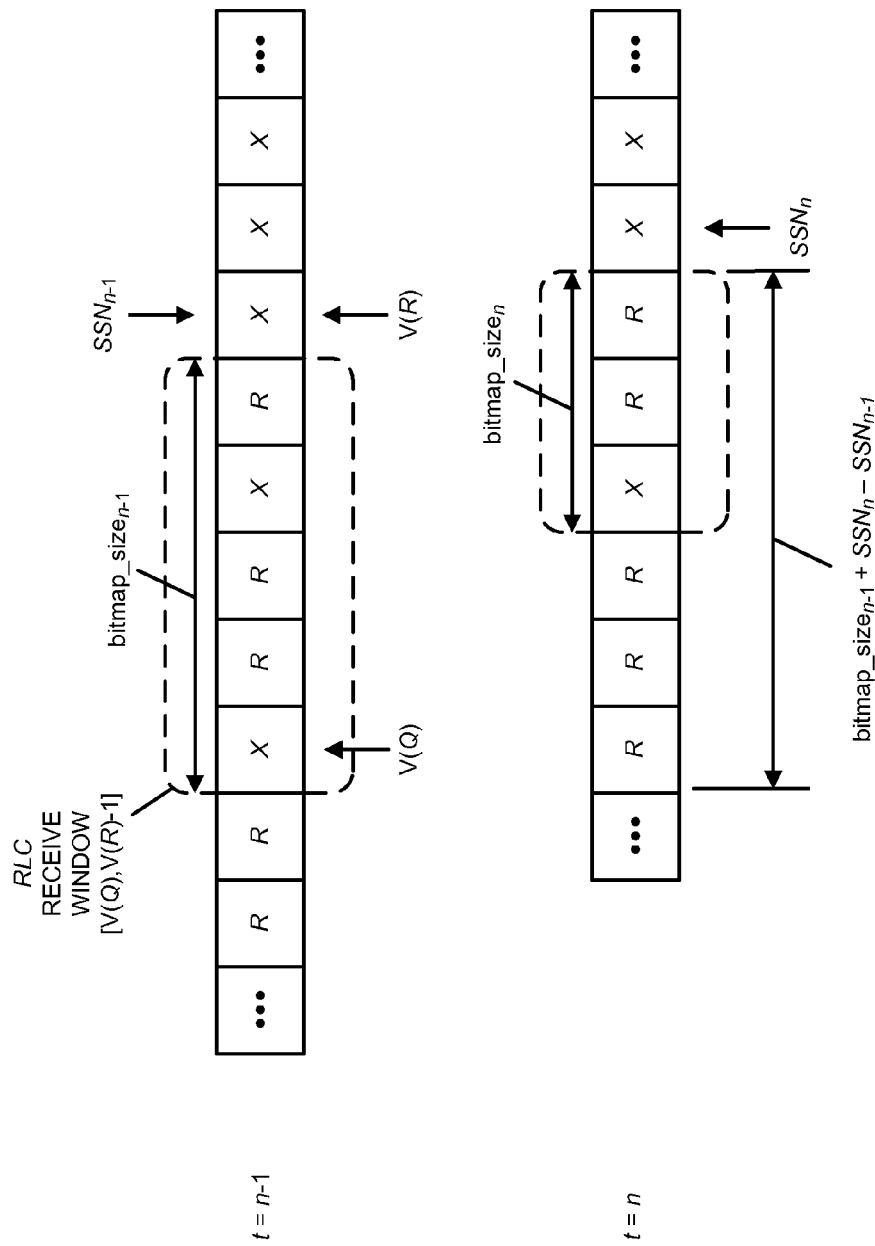
FIG. 5 is a drawing illustrating determination of a communication quality metric in accordance with an embodiment of the present disclosure.

An improved approach for computing the NACK_ratio in GPRS includes information about the SSN. In particular, consider the two consecutive bitmaps shown in FIG. 5, which presents a drawing illustrating determination of a communication quality metric in GPRS. Computing the NACK_ratio for the $n^{th}$ packet (NACK_ratio$_n$) with the SSN gives $$\text{NACK\_ratio}_n = \frac{nNACK_n}{SSN_n - SSN_{n-1} + \text{bitmap\_size}_{n-1}}.$$

Using this equation, the bitmaps for sequences 406 and 408 have the same NACK_ratio$_n$, 1/6. In this equation, nNACK$_n$ is the number of 0s in the $n^{th}$ packet, SSN$_n$ is the SSN of the $n^{th}$ UL packet ACK/NACK message received, bitmap_size$_n$ is the length of the bitmap in the $n^{th}$ UL packet ACK/NACK message received, and the denominator is the number of RLC blocks over which the NACK_ratio$_n$ is computed. Note that if the compressed bitmap (CRBB) is used, the bitmap_size$_n$ is equal to the sum of the decoded CRBB and, if available, the uncompressed bitmap (URBB).

Figure 6:
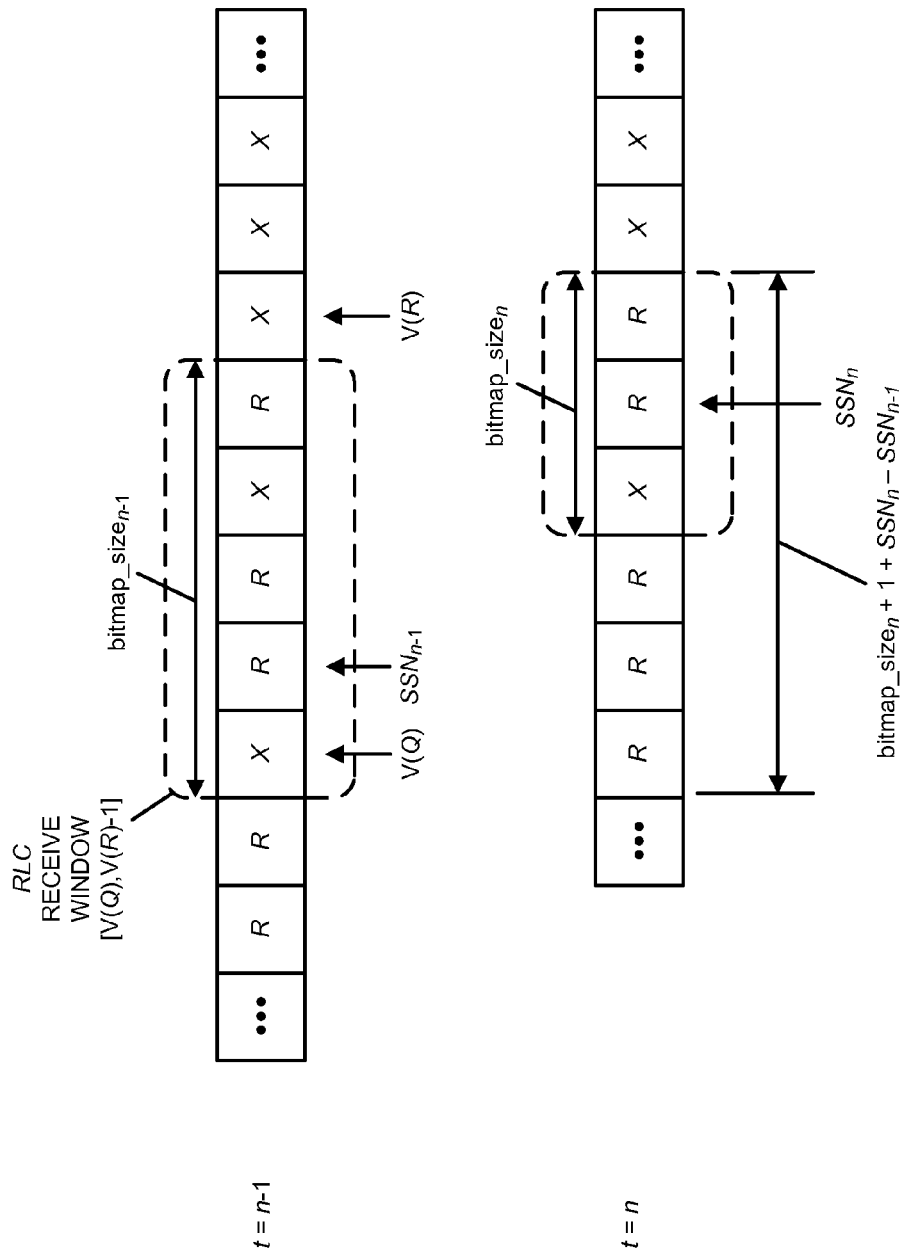
FIG. 6 is a drawing illustrating determination of a communication quality metric in accordance with an embodiment of the present disclosure.

Similarly, an improved approach for computing the NACK_ratio$_n$ in EGPRS includes information about the SSN. In particular, consider the two consecutive bitmaps shown in FIG. 6, which presents a drawing illustrating determination of a communication quality metric in EGPRS. Computing the NACK_ratio$_n$ for the $n^{th}$ packet with the SSN gives $$\text{NACK\_ratio}_n = \frac{nNACK_n}{1 + SSN_n - SSN_{n-1} + \text{bitmap\_size}_n}.$$

This equation results in bitmaps for sequences 406 and 408 having the same NACK_ratio$_n$, 1/6.

Figure 7:
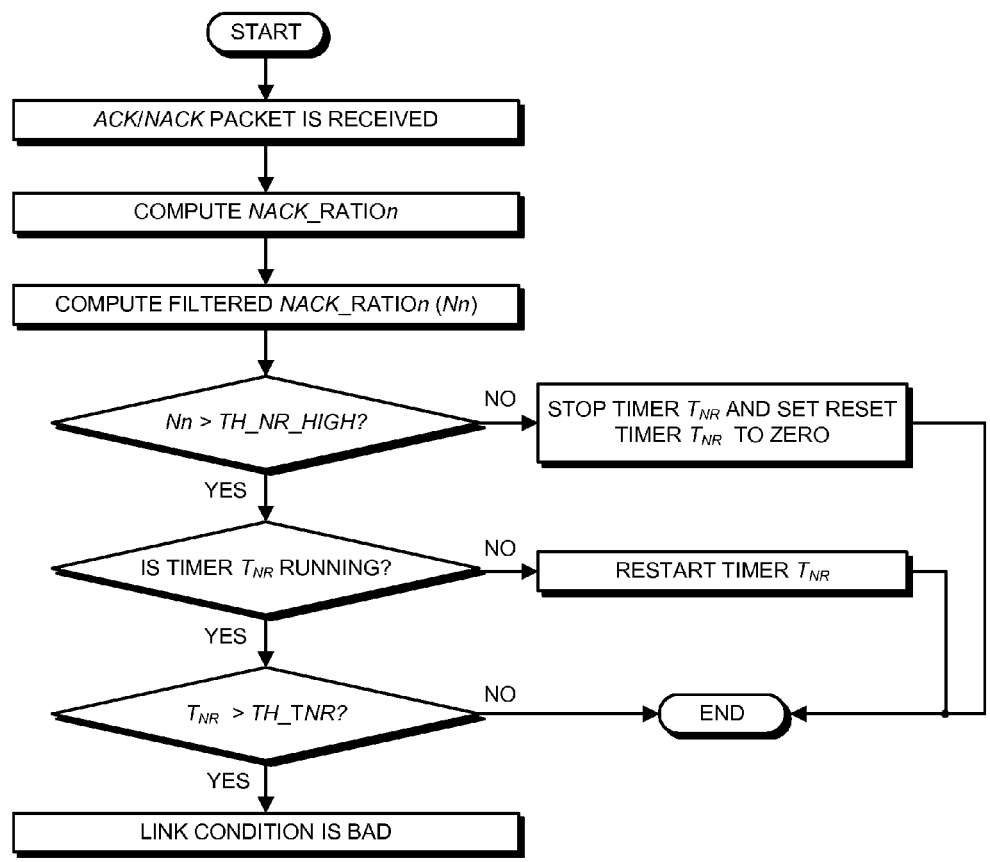
FIG. 7 is a flow diagram illustrating a method for determining a communication quality metric in accordance with an embodiment of the present disclosure.

In order to reduce the variation in the NACK_ratio for different packets in a fading wireless channel, the NACK_ratio$_n$ for the $n^{th}$ packet may be filtered using an infinite-impulse-response (IIR) filter. In particular, the filtered NACK_ratio for the $n^{th}$ packet (N$_n$) may be determined using $$N_n = \alpha N_{n-1} + (1-\alpha) nNACK_n,$$

where α is a filtering coefficient. For example, α may be $1/2^k$, where k is a configurable integer. In this link-quality-detection (LQD) approach, N$_n$ may be updated whenever a new ACK/NACK packet is received. Moreover, if N$_n$ is larger than a threshold value, TH_NR_HIGH, consecutively for a predefined time interval, TH_TNR, then the link quality may be declared as bad. For example, TH_NR_HIGH may be 0.3-0.5 and TH_TNR may be 1-2 s. This LQD approach is illustrated FIG. 7, which presents a flow diagram illustrating a method for determining a communication quality metric.

Another approach for determining the communication quality metric is based on the retransmission ratio. Consider a wireless system in which the sender and the receiver use a retransmission mechanism to reliably transmit data packets to the receiver. In such a system, if the channel or link condition from the sender to the receiver degrades quickly, then packets will be lost in the air and the receiver will request retransmission of the missing data packets, which increases the number of retransmissions. However, if the channel condition improves, more new packets will be transmitted. Thus, the ratio of the number of retransmitted packets and the number of newly transmitted packets for a given time window or interval (such as over approximately 1 s), RETX_ratio(t), can be used as an indicator for a bad-link condition. In particular, $$\frac{\Delta RETX}{(\Delta TX + 1)} > TH\_RETX, \text{ or}$$

$$\frac{\Delta RETX}{(\Delta RETX + \Delta TX)} > TH\_RETX,$$

where $\Delta RETX$ and $\Delta TX$ are, respectively, the number of retransmitted and newly transmitted packets for last average seconds in the time window (AVG_WND), and TH_RETX is a threshold value. For example, in the first equation, TH_RETX may be 10, i.e., one new transmission for 10 retransmissions. Note that '1' is added to the denominator in the first equation to prevent an infinite value when $\Delta TX$ is zero. Alternatively, in the second equation, TH_RETX may be 0.6-0.9.

In an exemplary embodiment, the retransmission ratio is computed in GPRS or EGPRS. Let N_TX(t) and N_RETX(t) be the counter values at time t that are, respectively, incremented by one whenever a new transmission (excluding control packets) or retransmission occur. Moreover, the counters may be reset to zero whenever Temporary Block Flow (TBF) is released and established. (Note that TBF is the physical connection between the sender and the receiver for the duration of the link of packet data transfer). Then, the differential values $\Delta TX(t)$ and $\Delta RETX(t)$ can be computed when there is no counter reset in the time interval [t−AVG_WND, t] using $$\Delta TX(t) = N\_TX(t) - N\_TX(t - AVG\_WND)$$

and $$\Delta RETX(t) = N\_RETX(t) - N\_RETX(t - AVG\_WND).$$

However, if the counter(s) reset during the time interval [t−AVG_WND, t], these equations result in negative values of $\Delta TX(t)$ and $\Delta RETX(t)$. In order to avoid this, incremental values of $\Delta TX(t)$ and $\Delta RETX(t)$ can be computed every $\mu$ seconds, i.e., $\Delta TX_\mu(t)$ and $\Delta RETX_\mu(t)$, and these incremental values can be summed or aggregated to compute $\Delta TX(t)$ and $\Delta RETX(t)$. In particular, every $\mu$ seconds, compute $$\Delta TX_\mu(t) = N\_TX(t) - N\_TX(t - \mu).$$

If N_TX(t) is reset (e.g., when TBF is released and re-established or N_TX(t) is reached to its maximum value) during t and t−$\mu$, then $\Delta TX_\mu(t)$ is set to N_TX(t). Similarly, every $\mu$ seconds, compute $$\Delta RETX_\mu(t) = N\_RETX(t) - N\_RETX(t - \mu).$$

If N_RETX(t) is reset (e.g., when TBF is released and re-established or N_RETX(t) is reached to its maximum value), then $\Delta RETX_\mu(t)$ is set to N_RETX(t).

In addition, when the RETX_ratio(t) is requested, the following calculations may be performed:

$$\Delta TX(t) = \sum_{\beta=0}^{\beta=AVG\_WND} TX_\mu(t - \beta),$$

$$\Delta RETX(t) = \sum_{\beta=0}^{\beta=AVG\_WND} RETX_\mu(t - \beta), \text{ and}$$

$$RETX\_ratio(t) = \frac{\Delta RETX(t)}{\Delta TX(t) + 1}.$$

(Note that, in some embodiments, the other equation or formula for computing the RETX_ratio(t) is used.) If the RETX_ratio(t) exceeds TH_RETX, then the link condition may be bad.

Figure 8:
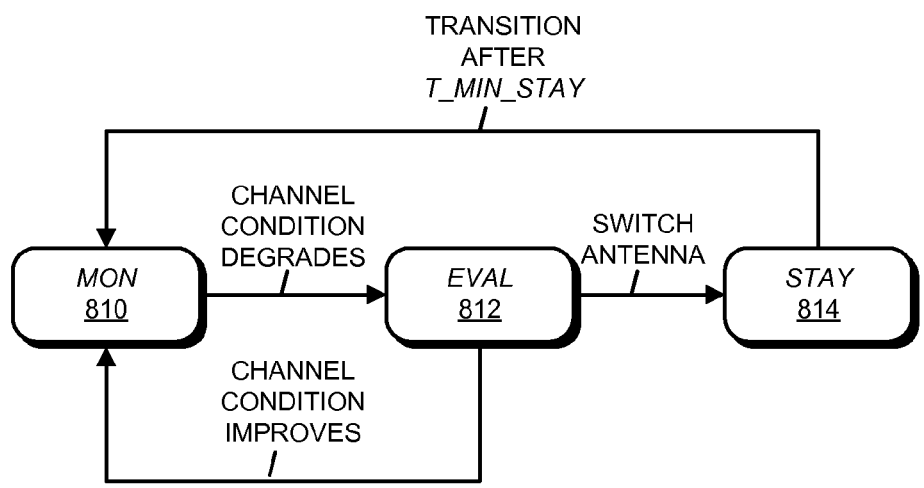
FIG. 8 is a drawing illustrating an antenna-switching state diagram in accordance with an embodiment of the present disclosure.

As noted previously, an IIR filter can be used to average the communication quality metric. However, as the electronic device moves through the states shown in FIG. 8, which presents a drawing illustrating an antenna-switching state diagram, it may be necessary to conditionally reset this IIR filter. This conditional resetting of the IIR filter is described below.

Figure 13:
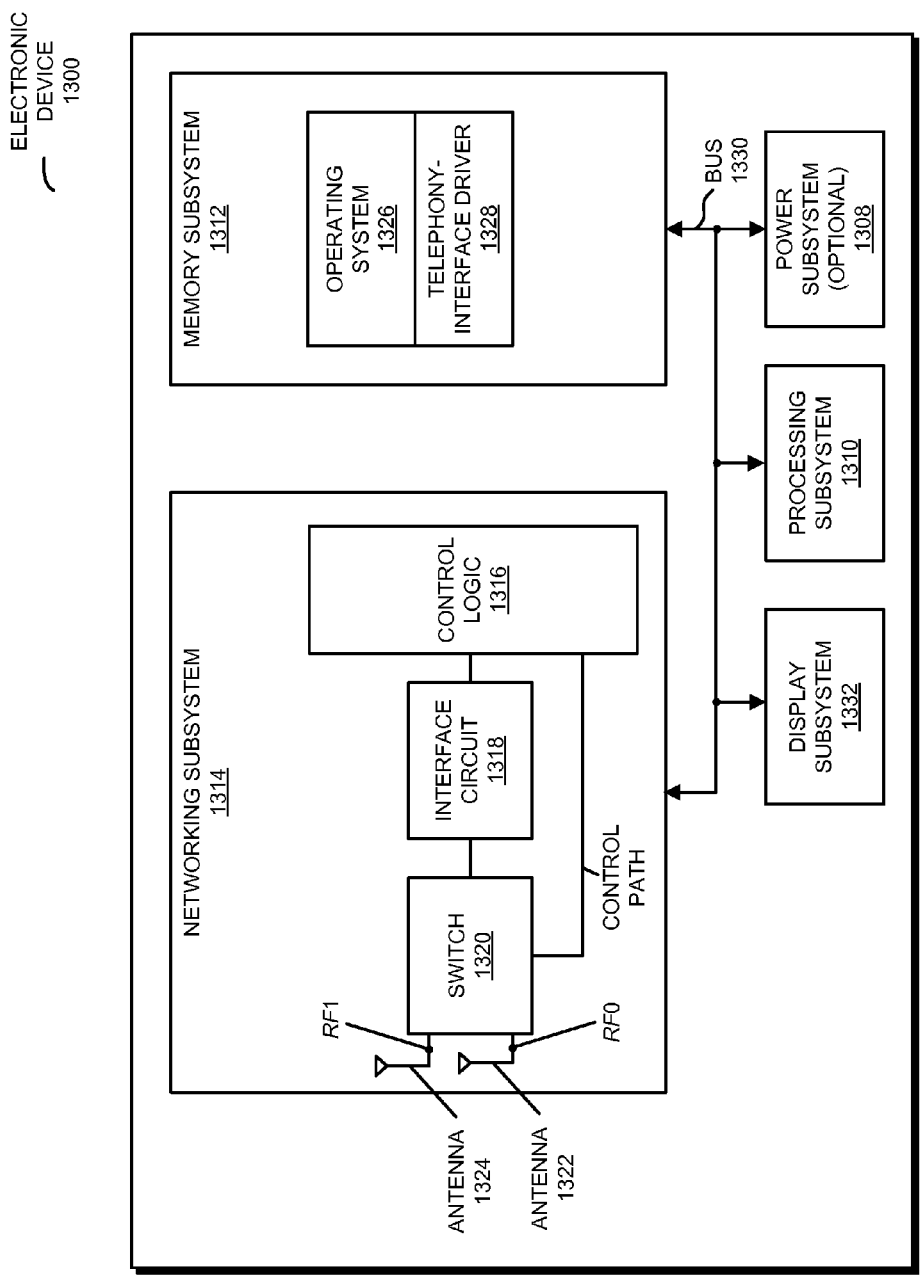
FIG. 13 is a block diagram illustrating an electronic device in accordance with an embodiment of the present disclosure.

Using an electronic device with the architecture shown in FIG. 13 as an illustrative example, in monitor (MON) 810 state the electronic device periodically monitors the RSSI of the current antenna to check for the degradation of the DL channel condition. (Note that the filtered RSSI value is denoted by $M_n$.) If the channel condition degrades (i.e., if $M_n$ is less than a threshold value for a bad DL channel, TH_BAD) for the monitor timer (TM) seconds, the electronic device may enter evaluate (EVAL) 812 state, and compare the filtered RSSI values from the two antennas. For example, in EVAL 812 state the electronic device may toggle the antenna, and then may measure the RSSI value from each of the antennas for 2-3 s.

In EVAL 812 state, the filtered difference of RSSI values from the two antennas ($R_n$) is periodically updated. Let $\Delta Rx_n$ be the difference of the RSSI values from the other antenna and the current antenna, i.e., $\Delta Rx_n$ equals the $RSSI_n$ for the other antenna minus the $RSSI_n$ for the current antenna. Then $\Delta Rx_n$ is filtered to reduce variation, for example, $$R_n = (1-\beta) \cdot R_{n-1} + \beta \Delta Rx_n,$$

where is a filter coefficient. If $R_n$ is greater than a threshold value, TH_R, for the evaluation timer (TE) seconds, the electronic device switches the antenna and enters stay (STAY) 814 state; otherwise, the electronic device move back to MON 810 state. Once the electronic device has stayed in STAY 814 state for T_MIN_STAY seconds, it moves back to MON 810 state. For example, T_MIN_STAY may be 1 second.

Consider two consecutive entrances into EVAL 812 state, e.g., MON 810→EVAL 812→MON 810→EVAL 812. Let $R_{n-1}$ and $R_n$ be the last and the first filtered $\Delta Rx$ values in the first and second instances of EVAL 812 state, respectively. If the time difference between the two times $R_{n-1}$ and $R_n$ was updated is greater than TH_DIFF (such as 2 s), $R_n$ may be updated using only the current sample $\Delta Rx_n$, i.e., $R_n$ is set to $\Delta Rx_n$ because of the low correlation between $R_{n-1}$ and $R_n$. Otherwise, $R_{n-1}$ may be reused to update $R_n$ because $R_{n-1}$ is highly correlated with $R_n$, i.e., $$R_n = (1-\beta) \cdot R_{n-1} + \beta \Delta Rx_n.$$

Note that, if the antenna is switched between two instances of EVAL 812 state, e.g., EVAL 812→STAY 814→MON 810→EVAL 812, $R_n$ may be used with a negative sign, i.e., $$R_n = (1-\beta) \cdot (-R_{n-1}) + \beta \Delta Rx_n.$$

This is a result of the definition of $\Delta Rx_n$. Also note that this conditional filter-reset technique can be used in an arbitrary filtering technique in which the filter-update interval is variable.

Figure 9:
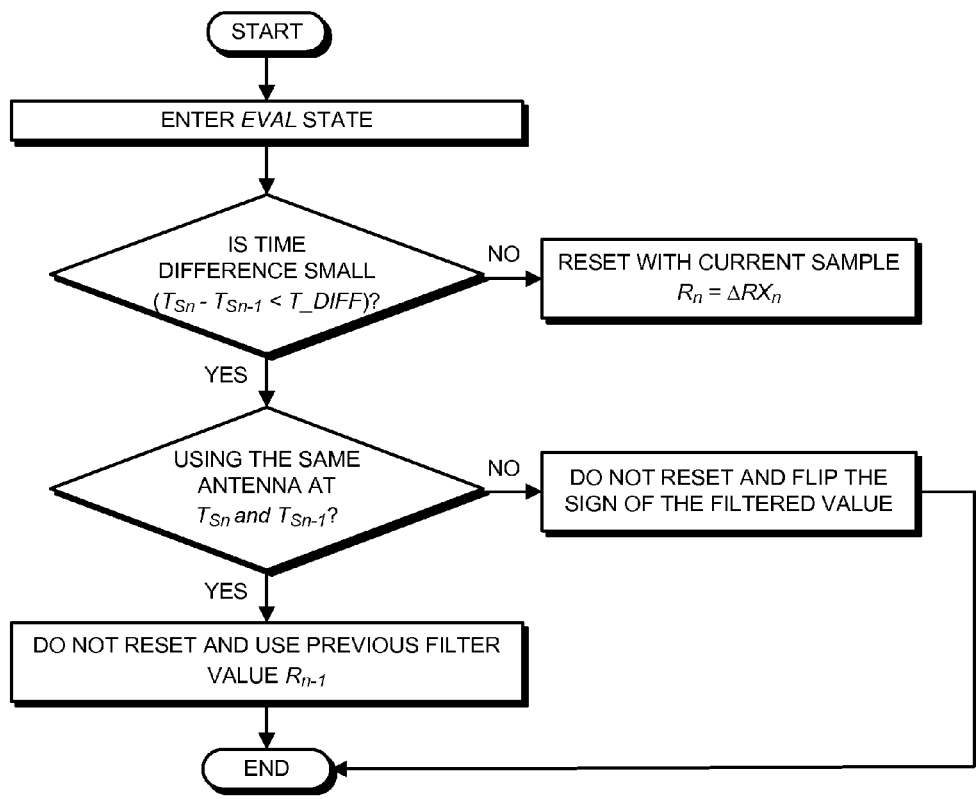
FIG. 9 is a flow diagram illustrating a method for conditionally resetting a filter in accordance with an embodiment of the present disclosure.

This filter-reset technique is further illustrated in FIG. 9, which presents a flow diagram illustrating a method for conditionally resetting a filter. In this method, $TS_n$ denotes the time the current sample $S_n$ is measured, and $TS_{n-1}$ denotes the time the previous sample $S_{n-1}$ was measured. In addition, note that β may be chosen so that the average filter time constant is approximately 1 s.

Figure 10:
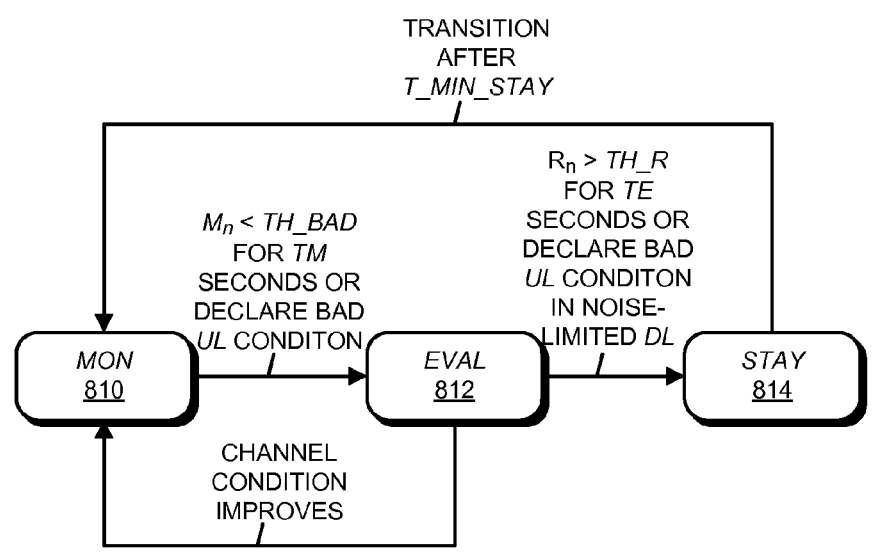
FIG. 10 is a drawing illustrating an antenna-switching state diagram in accordance with an embodiment of the present disclosure.

As described previously, the communication quality metric may be used to assess LQD and, thus, to guide antenna switching. This is further illustrated in FIG. 10, which presents a drawing illustrating an antenna-switching state diagram. In particular, the determined communication quality metric may be used to trigger a transition or switching from MON 810 state to EVAL 812 state when the UL condition is bad. Alternatively or additionally, the determined communication quality metric may be used to trigger a transition or switching from EVAL 812 state to STAY 814 state (and, thus, antenna switching) in a DL noise-limited condition. For example, the DL may be noise limited if $$(M_n < N\_FLOOR) \& (|R_n| < DELTA\_RX\_TH),$$

where N_FLOOR and DELTA_RX_TH are threshold values.

As an illustration, we now discuss an antenna-switching technique based on measurements of a single antenna port, e.g., using a single receive chain. For example, the electronic device may include two antennas in which RSSI measurements are periodically taken from the current antenna only. This is a constraint in the electronic device in which either: two Rx chains cannot be simultaneously enabled. This antenna-switching technique may include one or more of the following guidelines: absolute threshold based operation (if measurement from the current antenna exceeds the threshold value, continue using the current antenna); blind (timer-based) switching or BLS (if the electronic device uses a given antenna for, say, 1 second, and the channel is still bad, i.e., below the threshold value, and if measurements across the antennas are unavailable, then the electronic device performs blind antenna switching); and post-switching (PS) comparison (shortly after antenna switching, once measurements are available from the current antenna as well as the previous measurement from the other antenna, a switching decision may be made based on a comparison between the two measurements).

Figure 11:
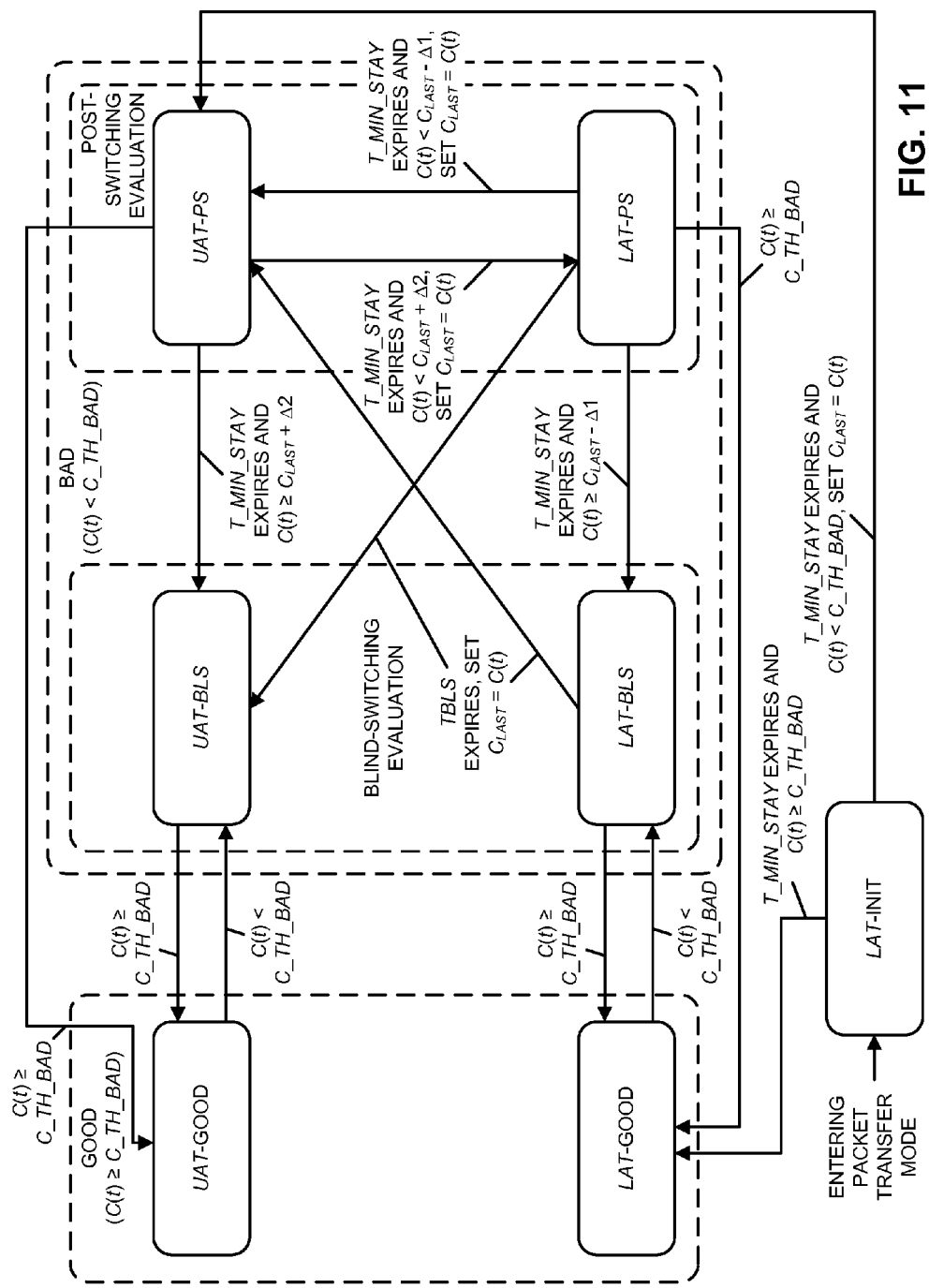
FIG. 11 is a drawing illustrating an antenna-switching state diagram in accordance with an embodiment of the present disclosure.

The antenna-switching technique is further illustrated in FIG. 11, which presents a drawing illustrating an antenna-switching state diagram, including states for antennas LAT and UAT, and state transitions. Starting in the LAT/UAT-GOOD state, if the current filtered (using the IIR filter) RSSI measurement at time t (C(t)) is greater than C_TH_BAD (i.e., if the channel is good), then the electronic device remains in the LAT/UAT-GOOD state (including using the current antenna).

If the channel degrades (i.e., C(t) less than C_TH_BAD), the electronic device enters the LAT/UAT-BLS state. Once the electronic device enters this state, after TBLS seconds it performs blind switching to the other antenna and enters the UAT/LAT-PS state. Then, after staying in this state for T_MIN_STAY seconds, the electronic device performs a post-switching evaluation or comparison. If current measurement C(t) is less than the previous measurement (Clast) plus an adjustment to Clast which is either Δ1 or Δ2 depending on the current state, then the electronic device switches the antenna and moves to the post-switching state of the other antenna. Otherwise, the electronic device moves to the BLS state of the current antenna. The state machine illustrated in FIG. 11 may update every 240 ms.

Figure 12:
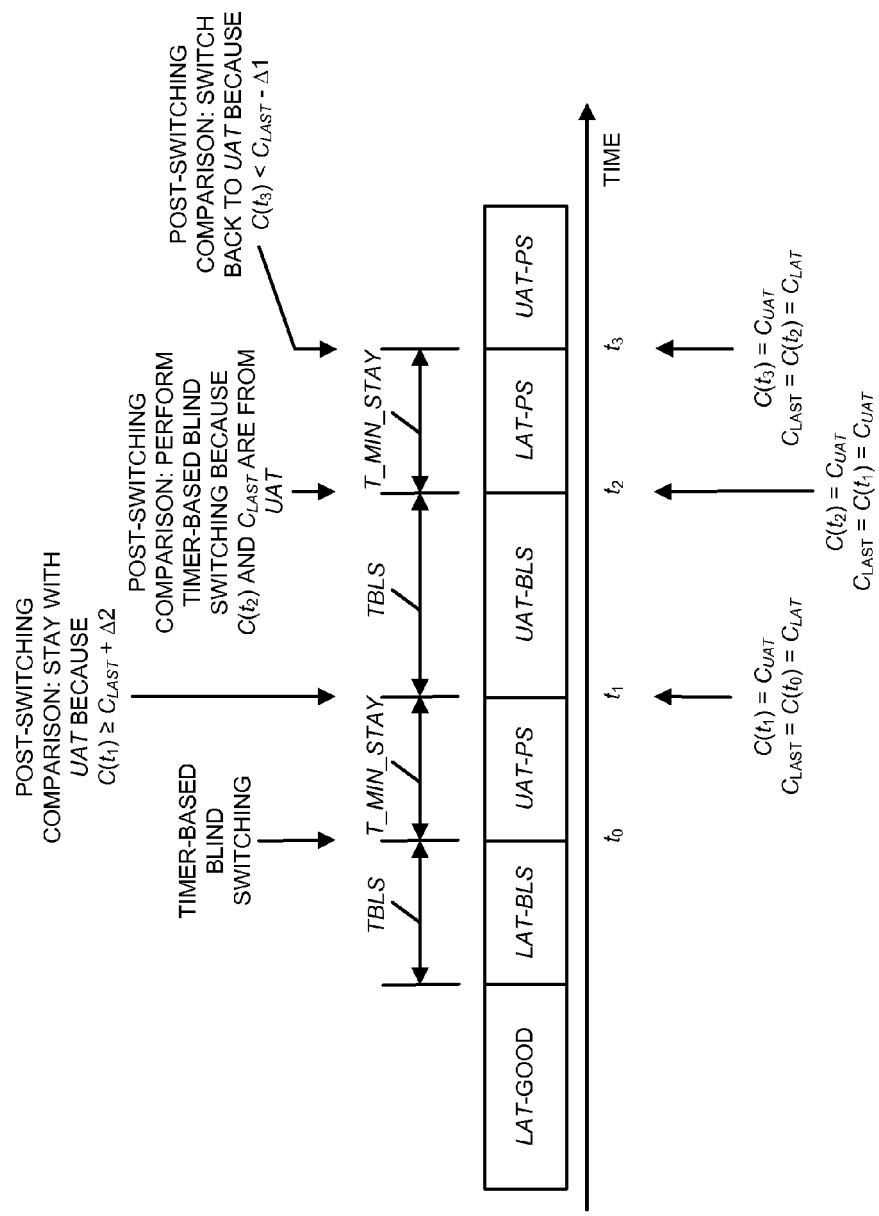
FIG. 12 is a timing drawing illustrating antenna switching in accordance with an embodiment of the present disclosure.

Examples of the states and the state transitions are shown in FIG. 12, which presents a timing drawing illustrating antenna switching. In particular, if the electronic device stays in either the LAT-BLS or the UAT-BLS state for more than TBLS seconds, then the electronic device performs blind (time-based) antenna switching.

Moreover, after this blind switching, a post-switching comparison may be performed. For example, T_MIN_STAY seconds after switching antennas, two measurements across the antennas may be available: C(t) and Clast. Note that it is assumed that Clast is still valid even after T_MIN_STAY seconds. When comparing the two measurements in the UAT-PS states at time t, the electronic device stays with the current antenna if C(t) is greater than Clast, and otherwise switches to the other antenna. Similarly, when comparing the two measurements in the LAT-PS states at time t, the electronic device stays with the current antenna if C(t) is greater than Clast, and otherwise switches to the other antenna.

We now describe embodiments of the electronic device. FIG. 13 presents a block diagram illustrating an electronic device 1300. This electronic device includes processing subsystem 1310, memory subsystem 1312, and networking subsystem 1314. Processing subsystem 1310 includes one or more devices configured to perform computational operations. For example, processing subsystem 1310 can include one or more microprocessors, application-specific integrated circuits (ASICs), microcontrollers, programmable-logic devices, and/or one or more digital signal processors (DSPs).

Memory subsystem 1312 includes one or more devices for storing data and/or instructions for processing subsystem 1310 and networking subsystem 1314. For example, memory subsystem 1312 can include dynamic random access memory (DRAM), static random access memory (SRAM), and/or other types of memory. In some embodiments, instructions for processing subsystem 1310 in memory subsystem 1312 include: one or more program modules or sets of instructions (such as telephony-interface driver 1328, which may implement one or more operations in the communication technique), which may be executed by processing subsystem 1310. Note that the one or more computer programs may constitute a computer-program mechanism. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured, to be executed by processing subsystem 1310.

In addition, memory subsystem 1312 can include mechanisms for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

Networking subsystem 1314 includes one or more devices configured to couple to and communicate on a wired and/or wireless network (i.e., to perform network operations), including: control logic 1316 (such as a cellular-telephone baseband chip), an interface circuit 1318 (such as a radio-frequency transceiver and front-end integrated circuit), a switch 1320 (such as a double-pole, double-throw switch) and antennas 1322 and 1324. For example, networking subsystem 1314 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. In particular, interface circuit 1318 may communicate information via a cellular-telephone network.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1300 may use the mechanisms in networking subsystem 1314 for performing simple wireless communication between the electronic devices, e.g., transmitting advertising frames and/or scanning for advertising frames transmitted by other electronic devices as described previously.

As noted previously, during operation of electronic device 1300, control logic 1316 may determine one or more communication quality metrics (e.g., based on RSSI, ACK/NACK messages, and/or newly transmitted and retransmitted packets), and may and provide a signal to switch 1320 specifying one of the antennas 1322 and 1324 based on the determined communication quality metric. In response to the signal, at a given time during operation of electronic device 1300, switch 1320 selectively couples interface circuit 1318 to one of antennas 1322 and 1324. Note that interface circuit 1318 may include a single receive chain. However, the communication technique implemented in electronic device 1300 can be used with an electronic device that includes multiple receive chains, which may be used for concurrent transmission and/or receiving of information. For example, electronic device 1300 may include dual receive ports that are simultaneously coupled to antennas 1322 and 1324.

Furthermore, electronic device 1300 may include an optional power subsystem 1308, such as a battery that includes one or more battery packs and/or one or more battery cells.

Within electronic device 1300, optional power subsystem 1308, processing subsystem 1310, memory subsystem 1312, and networking subsystem 1314 are coupled together using bus 1330. Bus 1330 may include an electrical, optical, and/or electro-optical connection that the subsystems can use to communicate commands and data among one another. Although only one bus 1330 is shown for clarity, different embodiments can include a different number or configuration of electrical, optical, and/or electro-optical connections between the subsystems.

In some embodiments, the electronic device includes a display subsystem 1332 for displaying information on a display, which may include a display driver and the display, such as a liquid-crystal display, a touchscreen, etc.

Electronic device 1300 can be (or can be included in) any electronic device with at least one network interface. For example, electronic device 1300 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 1300, in alternative embodiments, different components and/or subsystems may be present in electronic device 1300. For example, electronic device 1300 may include one or more additional processing subsystems 1310, memory subsystems 1312, networking subsystems 1314, and/or display subsystems 1332. Additionally, one or more of the subsystems may not be present in electronic device 1300. Moreover, in some embodiments, electronic device 1300 may include one or more additional subsystems that are not shown in FIG. 13. For example, electronic device 1300 can include, but is not limited to, a data collection subsystem, an audio and/or video subsystem, an alarm subsystem, a media processing subsystem, and/or an input/output (I/O) subsystem. Also, although separate subsystems are shown in FIG. 13, in some embodiments, some or all of a given subsystem or component can be integrated into one or more of the other subsystems or component(s) in electronic device 1300. For example, in some embodiments telephony-interface driver 1328 may be included in another software application (not shown) or an operating system 1326 executing on electronic device 1300.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1314, such as a radio. Moreover, the integrated circuit may include hardware and/or software mechanisms that are used for transmitting wireless signals from electronic device 1300 and receiving signals at electronic device 1300 from other electronic devices. Aside from the mechanisms herein described, radios are generally known in the art and hence are not described in detail. In general, networking subsystem 1314 and/or the integrated circuit can include any number of radios. Note that the radios in multiple-radio embodiments function in a similar way to the described single-radio embodiments.

In some embodiments, networking subsystem 1314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Note that while the communication quality metric(s) were used to guide antenna switching, in other embodiments one or more of the communication quality metrics may be used to adapt a link or to determine how to use a link.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a first antenna and a second antenna;
a switch coupled to the first antenna and the second antenna;
an interface circuit, coupled to the switch, configured to communicate information via a cellular-telephone network, wherein, at a given time during operation of the electronic device, the switch is configured to selectively couple the interface circuit to one of the first antenna and the second antenna; and
control logic, coupled to the interface circuit and the switch, configured to determine a communication quality metric based on the communicated information and to provide a signal to the switch selecting one of the first antenna and the second antenna based on the determined communication quality metric.

2. The electronic device of claim 1, wherein the interface circuit includes a single receive chain.

3. The electronic device of claim 1, wherein the communication quality metric is based on acknowledgment (ACK) and negative-acknowledgment (NACK) messages in the communicated information.

4. The electronic device of claim 1, wherein the communication quality metric is based on a ratio of a number of NACK messages to a difference of starting positions of consecutive ACK/NACK message time windows plus a size of an ACK/NACK message time window.

5. The electronic device of claim 4, wherein the communication quality metric is substantially stable as a location of the ACK/NACK message time window used to compute the ratio is varied in the sequence of packets.

6. The electronic device of claim 1, wherein determining the communication quality metric involves filtering.

7. The electronic device of claim 1, wherein the communication quality metric is based on a number of packets retransmitted and a number of new packets transmitted in the communicated information.

8. The electronic device of claim 1, wherein the communication quality metric is based on a number of packets retransmitted in the communicated information.

9. The electronic device of claim 8, wherein determining the communication quality metric involves accumulating incremental communication quality metrics determined in sub-time intervals when the information is communicated.

10. An integrated circuit, comprising control logic configured to:
couple to an interface circuit and a switch in an electronic device;
determine a communication quality metric based on information communicated via the interface circuit and a cellular-telephone network; and
provide a signal to a switch in the electronic device specifying selective coupling of the interface circuit to one of a first antenna and a second antenna in the electronic device based on the determined communication quality metric, wherein, at a given time during operation of the electronic device, the switch selectively couples the interface circuit to one of the first antenna and the second antenna.

11. The integrated circuit of claim 10, wherein the interface circuit includes a single receive chain.

12. The integrated circuit of claim 10, wherein the communication quality metric is based on acknowledgment (ACK) and negative-acknowledgment (NACK) messages in the communicated information.

13. The integrated circuit of claim 10, wherein the communication quality metric is based on a ratio of a number of NACK messages to a difference of starting positions of consecutive ACK/NACK message time windows plus a size of an ACK/NACK message time window.

14. The integrated circuit of claim 13, wherein the communication quality metric is substantially stable as a location of the ACK/NACK message time window used to compute the ratio is varied in the sequence of packets.

15. The integrated circuit of claim 10, wherein determining the communication quality metric involves filtering.

16. The integrated circuit of claim 10, wherein the communication quality metric is based on a number of packets retransmitted and a number of new packets transmitted in the communicated information.

17. The integrated circuit of claim 10, wherein the communication quality metric is based on a number of packets retransmitted in the communicated information.

18. The integrated circuit of claim 17, wherein determining the communication quality metric involves accumulating incremental communication quality metrics determined in sub-time intervals when the information is communicated.

19. An electronic-device-implemented method for selectively coupling an interface circuit to one of a first antenna and a second antenna in the electronic device, wherein the method comprises:
determining a communication quality metric based on information communicated via the interface circuit and a cellular-telephone network;
providing a signal to a switch in the electronic device specifying the selective coupling of the interface circuit to one of a first antenna and a second antenna in the electronic device based on the determined communication quality metric; and at a given time during operation of the electronic device, selectively coupling the interface circuit to one of the first antenna and the second antenna using the switch.

20. The method of claim 19, wherein the interface circuit includes a single receive chain.

* * * * *